(12) United States Patent
Chavand

(10) Patent No.: US 6,288,650 B2
(45) Date of Patent: *Sep. 11, 2001

(54) DEVICE AND METHOD FOR MONITORING THE OPERATION OF AN INDUSTRIAL INSTALLATION

(75) Inventor: André Chavand, Eybens (FR)

(73) Assignee: Alpes Systeme Automation, Eybens (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,417

(22) Filed: Dec. 10, 1998

(30) Foreign Application Priority Data

Dec. 24, 1997 (FR) .................................................. 97 16489

(51) Int. Cl.$^7$ ..................................................... G08B 21/00
(52) U.S. Cl. .......................... 340/679; 340/525; 364/188
(58) Field of Search ................................... 340/679, 525, 340/505, 506, 825.06, 825.36; 364/188

(56) References Cited

U.S. PATENT DOCUMENTS

| | | | |
|---|---|---|---|
| 3,638,191 | * 1/1972 | Mann | 340/649 |
| 4,396,977 | * 8/1983 | Slater et al. | 364/188 |
| 4,586,034 | * 4/1986 | Nakamine | 340/679 |
| 4,833,592 | 5/1989 | Yamanaka . | |
| 4,866,594 | 9/1989 | David et al. . | |
| 4,996,655 | * 2/1991 | Chadwick et al. | 340/679 |
| 5,297,252 | * 3/1994 | Becker | 340/525 |
| 5,644,487 | 7/1997 | Duff et al. . | |
| 5,812,055 | * 9/1998 | Candy et al. | 340/525 |

FOREIGN PATENT DOCUMENTS

| | | |
|---|---|---|
| 71865/81 | 12/1981 | (AT) . |
| 29606594 | 6/1996 | (DE) . |
| 0 389 132 | 9/1990 | (EP) . |
| WO 96/20439 | 7/1996 | (WO) . |
| WO 97/49099 | 12/1997 | (WO) . |

OTHER PUBLICATIONS

Abstract of 29606594.
Abstract of Australian 38854/93.

* cited by examiner

Primary Examiner—John A. Tweel
(74) Attorney, Agent, or Firm—Burns, Doane, Swecker & Mathis, L.L.P.

(57) ABSTRACT

The invention relates to a device for monitoring the operation of an industrial installation (3) comprising functional members (5), the said device (1) comprising groups ($G_1$, $G_2$ ... $G_n$) of detectors ($D_{1,1}$, ... $D_{n,j}$) that defect the operating status of the installation (3) these each being associated with a particular aspect of the monitoring, and a display unit (11) comprising means (13) of communicating the operating statuses picked up by the said detectors ($D_{1,1}$, ... $D_{n,j}$). The device comprises, arranged between the said detectors ($D_{1,1}$, ... $D_{n,j}$) and the display unit (11), means (15) for processing the operating statuses picked up by the said detectors ($D_{1,1}$, ... $D_{n,j}$) and for controlling the selective displaying, on the said display unit (11), of information relating to overall operating statuses of predetermined groups ($G_1$, $G_2$ ... $G_n$) of detectors ($D_{1,1}$, ... $D_{n,j}$).

28 Claims, 3 Drawing Sheets

DEVICE AND METHOD FOR MONITORING THE OPERATION OF AN INDUSTRIAL INSTALLATION

FIELD OF THE INVENTION

The invention relates to a device and to a method for monitoring the operation of an industrial installation, particularly an installation for supplying gas for the manufacture of circuits in the microelectronics industry.

DESCRIPTION OF THE RELATED ART

The manufacture of microelectronic circuits requires the use of various so-called "working" gases such as, for example, $Cl_2$, $NH_3$, HCl, HBr, $NF_3$, $WF_6$, etc., which are considered, for the most part, to be dangerous to man on account of their toxicity and/or their flammability.

These gases are conveyed to consumer stations, such as stations for manufacturing microelectronic circuits, via an installation for supplying these stations with gas, this installation comprising, for each gas, at least one station for supplying gas, also known by the name of "gas cabinet" and possibly a station for distributing the gas originating from a supply station so that several manufacturing stations can be supplied at the same time.

Because of the toxicity of the gases employed, a high priority is given to monitoring the operation of such a supply installation. In particular, in the event of a malfunction, it is important to be able to quickly identify the nature and location of the malfunction so that the required countermeasures can be taken before the malfunction can cause material or even human damage.

This is why such installations are equipped with a device for monitoring their operation comprising, on the one hand, groups of detectors that detect the operating status of the installation and, in particular, of each of the stations for supplying and distributing gas, each group of detectors being associated with a particular aspect of monitoring, such as monitoring gas leaks or monitoring the operating status of a specific station and, on the other hand, a display unit comprising means of communicating the operating status so that, in particular, alarms can be raised.

SUMMARY OF THE INVENTION

The object of the invention is to provide a monitoring device that makes it possible to present the operating status of an industrial installation while at the same time effectively identifying any malfunction or alarm detected.

To this end, the subject of the invention is a device for monitoring the operation of an industrial installation, particularly an installation for supplying gas for the manufacture of circuits in the microelectronics industry, the said installation comprising functional members, the said device comprising groups of detectors that detect the operating status of each of the functional members, each group of detectors being associated with a particular aspect that is to be monitored, such as monitoring gas leaks or monitoring the operating status of a functional member, and a display unit comprising means of communicating the operating statuses picked up by the said detectors, characterized in that it comprises, arranged between the said detectors and the display unit, means for processing the operating statuses picked up by the said detectors and for controlling the selective displaying, on the said display unit, of information relating to overall operating statuses of predetermined groups of detectors.

The monitoring device according to the invention may additionally have one or more of the following features:

the means for processing and controlling the selective displaying comprise a unit via which an operator can input commands, and means for storing in memory plans, each of which depicts at least part of the layout of the functional members of the installation, the said plans being intended to be displayed, under the control of the operator, by the said display unit together with at least one item of information indicating on the displayed plan the geographical position of at least one malfunction picked up by at least one detector of a predetermined group, the said plans depict various levels of detail, and the means for processing and controlling the selective displaying comprise means, under the control of the operator, for selecting plans to move from one level of detail to another, the plans with the highest level of detail each depict, as a synoptic view, a basic entity, especially a station for supplying or distributing gas, and the communicating means comprise means of displaying, on these plans with the highest level of detail, values of measurements picked up by the detectors associated with this basic entity and representing the operating status thereof, the said plans comprise a general plan which has the lowest level of detail and depicts the installation in its entirety, this general plan being intended to be displayed permanently and in parallel with plans with a higher level of detail by the said display unit, and the communicating means comprise means of displaying, on this general plan, an item of information that relates to the position of that part of the installation that is depicted in parallel on another synoptic diagram with a higher level of detail.

the means for processing and controlling the selective displaying comprise means of coding the operating statuses so that the said information can be displayed in coded form, the code used by the coding means is a three-colour code, in which one colour is associated with correct operation, one with a malfunction of minor significance and one with a significant malfunction.

Another subject of the invention is a method for monitoring the operation of an industrial installation, particularly an installation for supplying gas for the manufacture of circuits in the microelectronics industry, the said installation comprising functional members, characterized in that it comprises the following steps:

the functional status of the functional members is detected, groups of detected functional statuses are formed, each group being associated with a particular aspect that is to be monitored, such as the monitoring of gas leaks or the monitoring of the operational status of a specific station, and overall operating statuses of the said groups are displayed on a display unit.

The monitoring method according to the invention may additionally have one or more of the following features:

the method further comprises a step which consists in the said display unit displaying, under the control of an operator, a plan that depicts at least part of the layout of the functional members of the installation together with at least one item of information indicating on the displayed plan the geographical position of at least one detected malfunction, the said plans depict various levels of detail and the method further comprises the step which consists in selecting, under the control of the operator, a plan in order to move on from one level of detail to another, the said plans with the highest level of detail each depict, in a synoptic view, a basic entity, especially a station for supplying or distributing gas, and the method comprises the step which consists in displaying, on these plans with the highest level of detail, values of measurements that characterize the detected operating status, the said plans comprise a general plan which has the lowest level of representation and depicts the installation in its entirety, and the method comprises the step which consists in displaying this general plan permanently and in parallel with plans with a higher level of detail on the said display unit, and there is displayed on this general plan, an item of information that relates to the position of that part of the installation that is depicted in parallel on another synoptic diagram with a higher level of detail, the method comprises the step which consists in coding the operating statuses and in displaying the operating statuses in coded form, the code used for coding is a three-colour code in which one colour is associated with correct operation, one with a malfunction of minor significance and one with a significant malfunction.

BRIEF DESCRIPTION OF THE FIGURES OF THE DRAWING

Other features and advantages of the invention will emerge from the following description given merely by way of non-limiting example, with reference to the appended drawings, in which.

DETAILED DESCRIPTION OF THE PREFERRED EMBODIMENT

Figure 1:
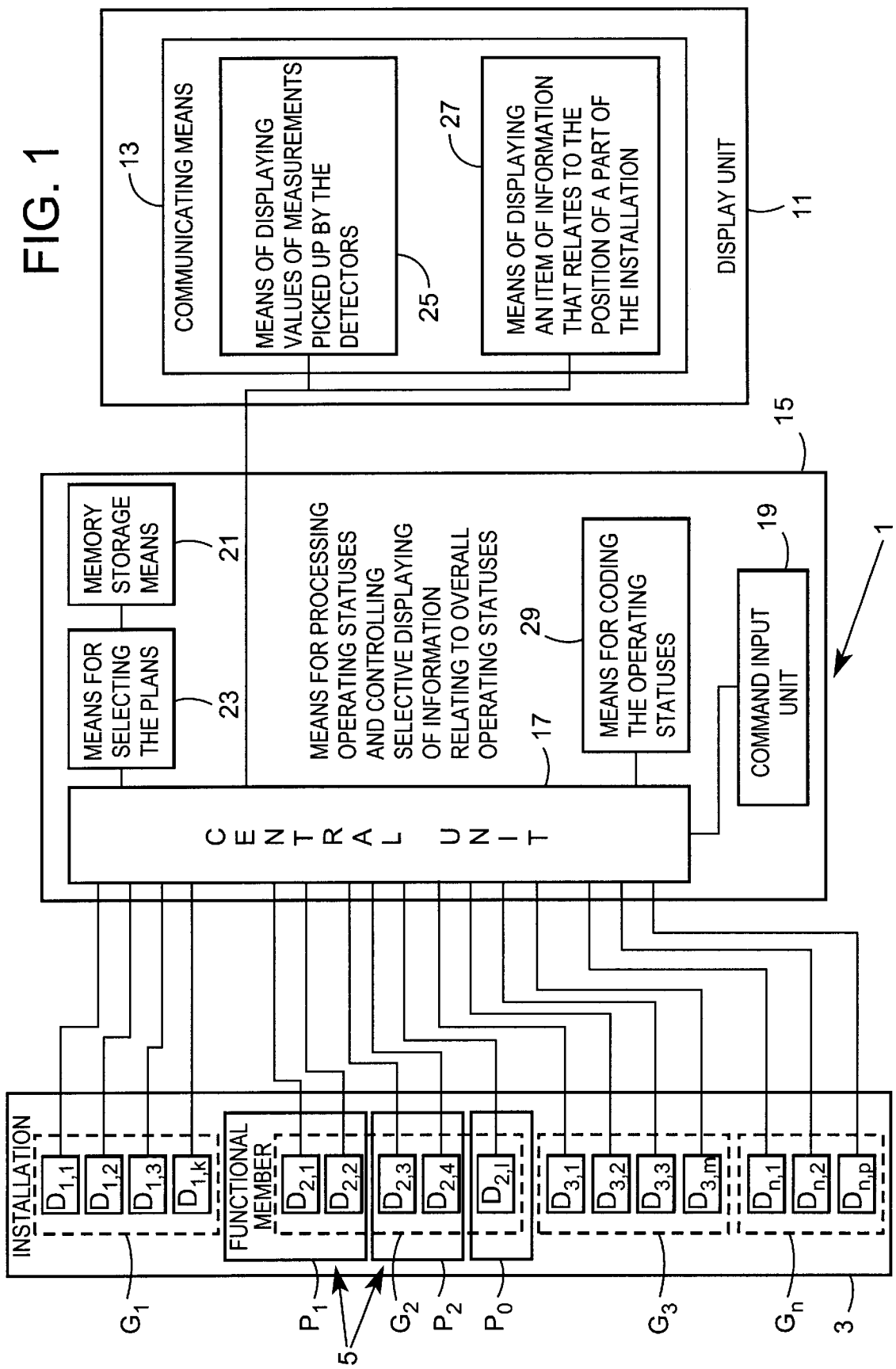
FIG. 1 is a synoptic diagram of a device for monitoring, according to the invention, the operation of an industrial installation.

FIG. 1 is a synoptic diagram of a device 1 for monitoring the operation of an industrial installation 3, such as, for example, an installation for supplying gas for the manufacture of circuits in the microelectronics industry.

This installation 3 comprises functional members 5 such as, for example, stations $P_1, P_2, \ldots P_o$ (o being any natural number) depicted synoptically. These stations $P_1, P_2, \ldots P_o$ are, for example, stations for supplying gas, also known by the name of "gas cabinets" or stations for distributing the gas coming from one of the supply stations. Using gas distribution stations it is possible, from just one gas supply station, to supply several consumer stations (not depicted) at the same time.

Given that these gas supply and distribution stations are well known to those skilled in the art, they will not be described in detail.

To monitor the operating status of the installation 3, the device 1 comprises groups $G_1, G_2, G_3 \ldots G_n$ (n being any natural number) of detectors.

The detectors of the various groups are referenced by the capital letter D with, as a suffix, a first number which corresponds to the number of the group, and a second number, which corresponds to the number of the detector within this group.

Thus, detector $D_{i,j}$ is the jth detector belonging to group number i (i, j, together with k, l, m, p which appear in FIG. 1, are any natural numbers).

Each group $G_1, G_2, G_3 \ldots G_n$ is associated with a particular aspect to be monitored of the industrial installation 3.

By way of example, the group $G_1$ of detectors comprises gas-leak detectors $D_{1,1}$ to $D_{1,k}$. These detectors $D_{1,1}$ to $D_{1,k}$ are installed at appropriate points in the installation 3, such as, for example, in the rooms in which the gas supply and distribution stations $P_1, P_2, \ldots P_o$ are installed.

The group $G_2$ of detectors comprises, for example, sensors $D_{2,1}$ to $D_{2,l}$ which sense the pressures prevailing in the pipes through which gas flows at the gas distribution and supply stations $P_1, P_2, \ldots P_o$, in order to monitor the operating status of each specific station.

The group $G_3$ of detectors comprises, for example, fire detectors $D_{3,1}$ to $D_{3,m}$ installed at appropriate points of the installation 3.

In addition, the device 1 comprises a display unit 11 comprising means 13 of communicating the operating statuses picked up by each $D_{i,j}$ of the detectors of the groups $G_1, G_2, G_3 \ldots G_n$.

Arranged between the detectors of the group $G_1, G_2, G_3 \ldots G_n$ and the display means 11 are means 15 for, on the one hand, processing the operating statuses picked up by each $D_{i,j}$ of the detectors and, on the other hand, controlling the selective displaying on the display unit 11 of information relating to overall operating statuses.

For this purpose, the means 15 comprise a central unit 17 to which are connected, on the one hand, all of the detectors $D_{1,1}, \ldots D_{n,p}$, and, on the other hand, the communicating means 13 of the display unit 11.

An overall operating status is to be understood as meaning an operating, status associated with a predetermined group $G_i$ of detectors $D_{i,1}, \ldots D_{i,k}$ and corresponding either to a correct operating status picked up by all of the detectors $D_{i,1}, \ldots D_{i,k}$ of the predetermined group $G_i$, or to a malfunction or alarm picked up by at least one $D_{i,j}$ of the detectors of the predetermined group $G_i$.

Thus, for example, an alarm relating to a gas leak can easily be distinguished from a malfunction which has occurred at a gas supply station, and this can advantageously speed up the decision-making process involved with the countermeasures to be taken in the light of the alarm or malfunction detected.

Furthermore, the means 15 for processing and controlling the selective displaying can be controlled by an operator responsible for monitoring the entire installation 3, by means of a command-input unit 19 connected to the central unit 17.

In addition, the means 15 for processing and controlling the selective displaying comprise means 21 for storing in memory plans, each of which depicts at least part of the layout of the premises of the installation 3 and of the supply and distribution stations $P_1, P_2, \ldots P_0$ located in these premises. These plans are intended to be displayed, under the control of the operator via the command input through the unit 19, on the said display unit 11 together with at least one item of information indicating on the displayed plan the geographical position of at least one malfunction picked up by at least one detector $D_{i,j}$.

These plans are at varying levels of detail, among which there has been mentioned, in particular, a general plan which has the lowest level of detail and depicts the installation in its entirety, and plans with the highest level of detail each depicting, in detail, as a synoptic view, a basic entity such as, for example, a specific gas supply or distribution station $P_i$.

In the example described and as will be explained in greater detail with reference to FIGS. 2 and 3, there are plans at three levels of detail:

i) the general plan which has the lowest level of detail and depicts the installation in its entirety, ii) intermediate plans, each depicting one room of the installation and the layout of the gas supply and distribution stations within these rooms, and iii) plans with the highest level of detail, depicting, in detail, as a synoptic view, each of the gas supply or distribution stations.

Of course, depending on the size of the installation, it is possible to increase the number of levels of detail in the drawings.

To select the plans to be displayed, the means 15 for processing and controlling the selective displaying further comprise, arranged between the memory-storage means 21 and the central unit 17, means 23 for selecting the plans.

Depending, on the one hand, on the operator's command input via the unit 19 and, on the other hand, on the plan displayed by the unit 11, the means 23 make it possible to select from the memory-storage means 21, a plan which is either at the level of detail immediately above, or the level of detail immediately below the level of detail of the plan displayed so as to allow the operator to move on from one level of detail to another.

Furthermore, the communicating means 13 comprise means 25 of displaying, on plans with the highest level of detail and depicting a synoptic view of a basic entity, values of measurements picked up by the detectors $D_{i,j}$ associated with this basic entity and which represent the operating status thereof.

To make it easier for the operator to identify the malfunctions or alarms on the image displayed by the unit 11, the general plan is displayed on this display unit 11 permanently and in parallel with one of the plans with a higher level of detail, and communicating means 13 additionally comprise means 27 of displaying on this general plan an item of information that relates to the position of that part of the installation depicted in parallel on the other plan with the higher level of detail.

In addition, the means 15 for processing and controlling the selective display comprise means 29 for coding the operating statuses so that the said information can be displayed in coded form.

Advantageously, the code used by the coding means 29 is a three-colour code in which one colour is associated with correct operation, for example the colour green, one with a malfunction of minor significance, for example the colour yellow, and one with a significant malfunction, for example the colour red.

Advantageously, the device according to the invention comprises a computer comprising a display screen, a keyboard and a mouse, and the memories of which are loaded, on the one hand, with the aforementioned plans and, on the other hand, with a program designed to perform the operations of processing the operating statuses picked up by the detectors and of controlling the selective display on the said screen.

From hereon, the operation of the device will be described with the aid of the images in FIGS. 2 and 3, which are displayed by the display unit 11.

Figure 2:
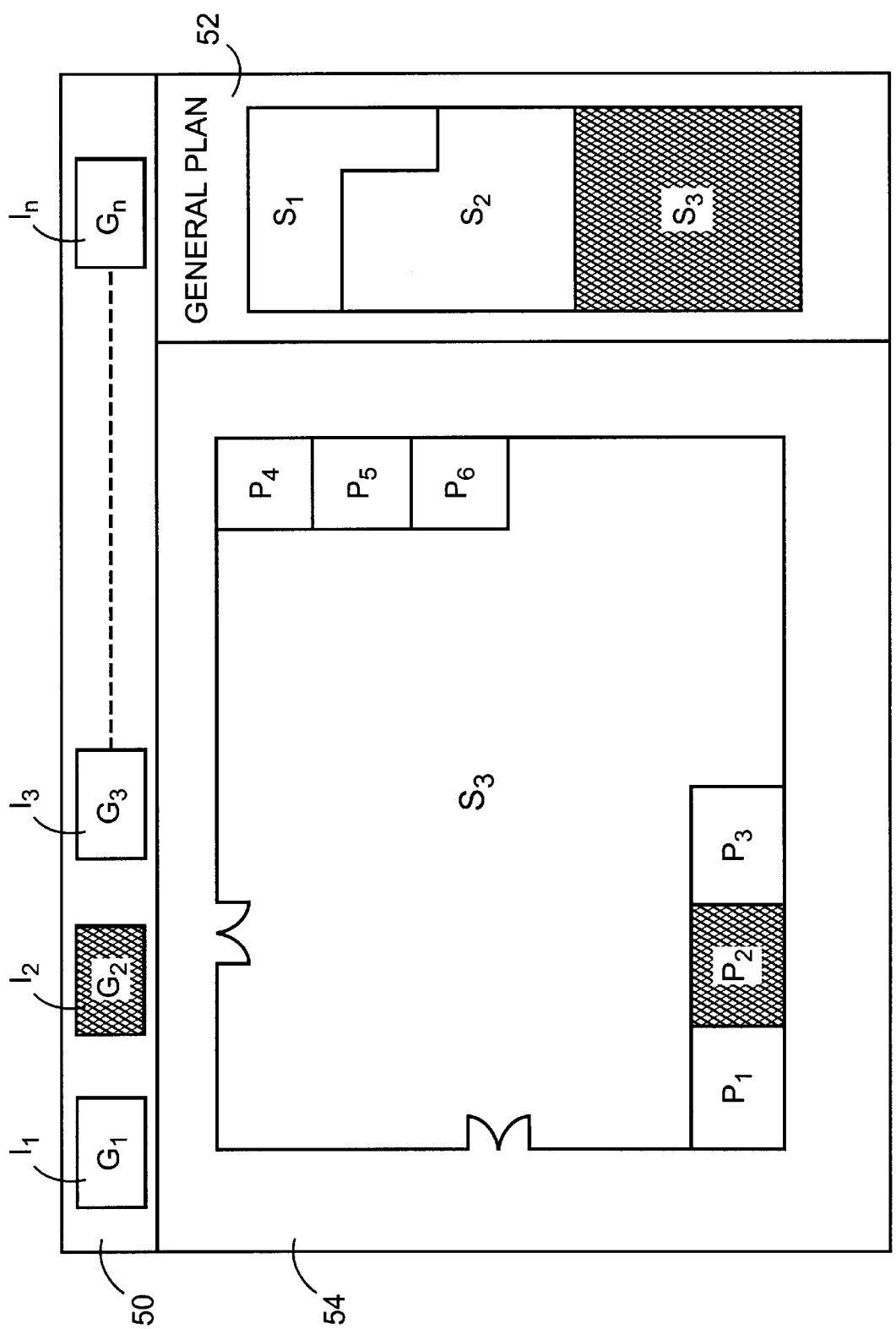
FIG. 2 depicts an image displayed by the display unit of the monitoring device of FIG. 1, illustrating, in particular, two plans, one of them corresponding to the lowest level of detail and the other corresponding to the level of detail immediately above.

FIG. 2 shows an example of an image displayed on a screen by the display unit 11 when the device 1 is in operation.

This image comprises, at the top of the screen, a first zone 50 in which icons $I_1, I_2, I_3 \ldots I_n$ are displayed. Written within these icons $I_1, I_2, I_3 \ldots I_n$ are the names of the groups $G_1, G_2, G_3 \ldots G_n$ respectively of detectors with which they are associated.

These icons $I_1, I_2, I_3 \ldots I_n$ are permanently displayed in the zone 50 and communicate the overall operating status of each group $G_i$ to an operator. Thus, even if the operator checks out, for example, the operating status of a specific station, the icons let him know, in real time, the operating status of each group $G_i$ and therefore of the entire installation 3 and this allows the operator to react quickly and effectively when another malfunction occurs.

In the event of correct operation picked up by all of the detectors of a group $G_i$, the corresponding icon $I_i$ is green. When at least one of the detectors $D_{i,j}$ of the group $G_i$ has picked up a malfunction of minor significance or a significant malfunction, the corresponding icon $I_i$ changes colour and, depending on the severity of the malfunction or of the alarm, turns yellow or red.

To the right of the screen, the image comprises a zone 52 in which the general plan with the lowest level of detail and which depicts the installation in its entirety is displayed. In the example under consideration, the installation 3 comprises three rooms $S_1, S_2$ and $S_3$. This general plan is also permanently displayed.

In the rest of the image, the zone 54, a plan of the room $S_3$ is displayed. This plan is more detailed and forms part of the intermediate level of detail. It shows the layout of the various stations $P_1$ to $P_6$ and the ways into and out of the room $S_3$.

In the image depicted, it has been considered, by way of example, that the supply to the gas supply station $P_2$ has been cut.

In this case, one of the detectors of the group $G_2$ which is associated with the station $P_2$ transmits an alarm to the means 15 for processing and controlling selective displaying. The means 29 code this alarm and the unit 17 commands the communication means 13 to display the icon $I_2$ in red, which is depicted in FIG. 2 by grey shading. Thus, the operator responsible for monitoring the installation 3 is informed that a significant malfunction has occurred at the gas distribution and supply stations.

To obtain more detailed information about the malfunction, particularly with a view to locating it, the operator enters a command via the unit 19 for a plan of the room in which the malfunction has occurred, that is to say the room $S_3$, to be displayed. On this plan of the room $S_3$, the depiction of the station $P_2$ is also red, to let the operator know that the malfunction has occurred at this station $P_2$. At the same time, and under the control of the means 27, the geographical position of the room $S_3$ with respect to the installation as a whole is indicated on the general plan, also by oblique hatching.

In order to determine the precise nature of the malfunction at the station $P_2$, the operator enters a command via the unit 19 for a plan with the highest level of detail representing a synoptic view of the station $P_2$ to be displayed.

Figure 3:
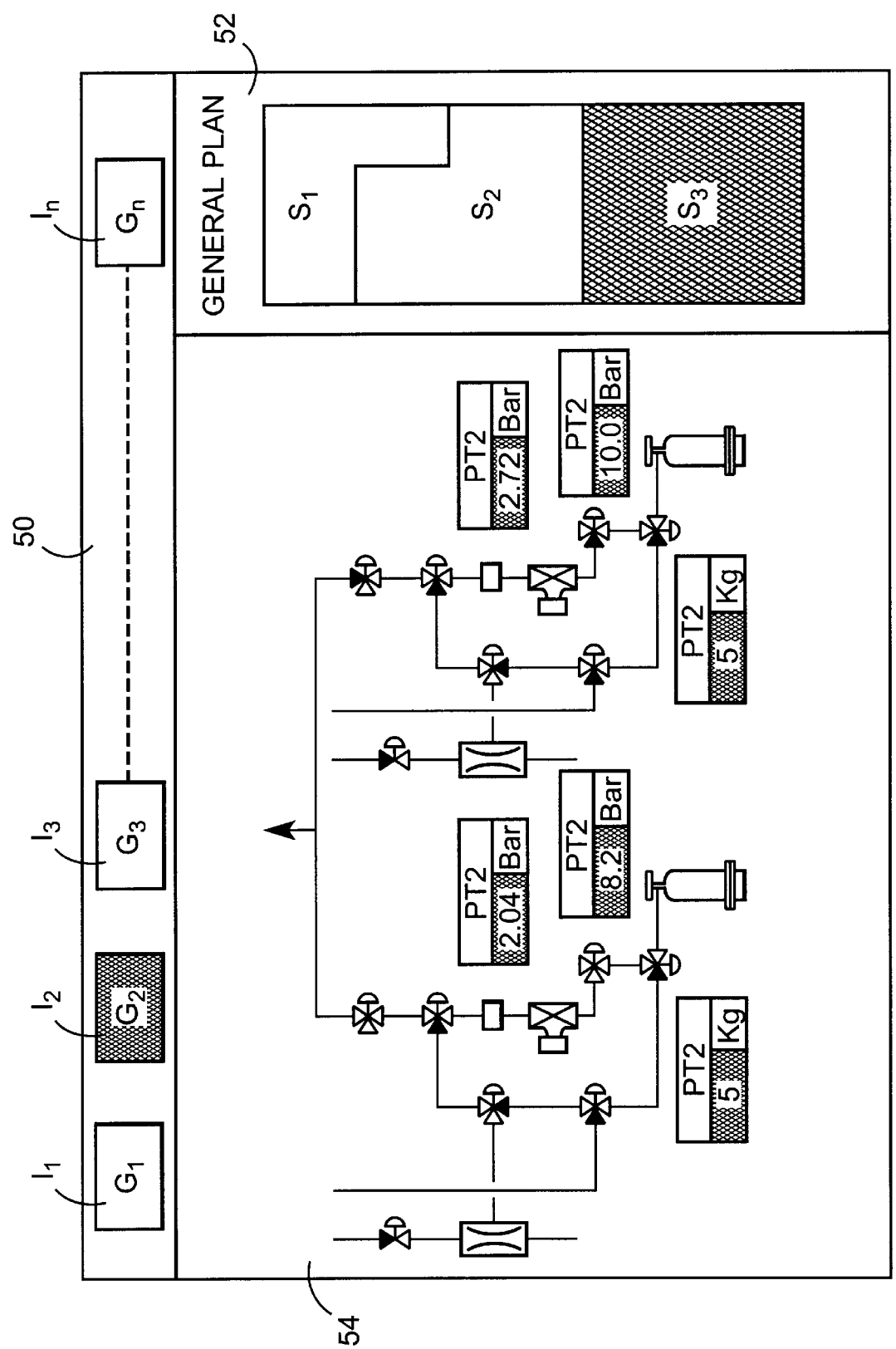
FIG. 3 depicts an image displayed on the display unit of the monitoring device of FIG. 1, illustrating, in particular, two plans, one corresponding to the lowest level of detail and the other corresponding to the highest level of detail.

The screen of the unit 11 therefore displays the image depicted in FIG. 3. This image differs from the image of FIG. 2 on the one hand by the fact that, the synoptic plan of the station $P_2$ is displayed in the zone 54 of the screen in place of the plan of the room $S_3$ in FIG. 2 and, on the other hand, by the fact that displayed on this synoptic plan of the station $P_2$ are values of measurements picked up by the detectors associated with this station and which represent the operating status thereof, this display of values being controlled by the display means 25.

The operator can thus immediately recognize the cause of the alarm detected.

It can therefore be seen that the monitoring device according to the invention advantageously allows an operator responsible for monitoring the installation to quickly gain an awareness of the operating status of the installation and effectively identify the location and nature of the malfunction that has occurred.

What is claimed is:

1. Device for monitoring the operation of an industrial installation, wherein the installation comprises functional members, the device comprising groups of detectors that detect the operating status of each of the functional members, wherein each group of detectors is associated with a particular functional aspect that is to be monitored, and a display unit comprising means of communicating the operating statuses picked up by the detectors, wherein the means of communicating the operating statuses comprises arranged between the detectors and the display unit, means for processing the operating statuses picked up by the detectors and for controlling the selective displaying, on the display unit, of information relating to an overall operating status of each group of detectors.

2. Device according to claim 1, wherein the means (15) for processing and controlling the selective displaying comprise a unit (19) via which an operator can input commands, and means (21) for storing in memory plans, each of which depicts at least part of the layout of the functional members (5) of the installation, the said plans being displayed, under the control of the operator, by the said display unit (11) together with at least one item of information indicating on the displayed plan the geographical position of at least one malfunction picked up by at least one detector ($D_{1,1}, \ldots D_{n,j}$) of a predetermined group ($D_{1,1}, \ldots D_{n,j}$).

3. Device according to claim 2, wherein the said plans represent various levels of detail, and in that the means (15) for processing and controlling the selective displaying comprise means (23), under the control of the operator, for selecting plans to move on from one level of detail to another.

4. Device according to claim 3, wherein the plans with the highest level of detail each depict, as a synoptic view, a station ($P_1, P_2, \ldots P_o$) for supplying or distributing gas, and in that the communicating means (13) comprise means (25) of displaying, on these plans with the highest level of detail, values of measurements picked up by the detectors ($D_{1,1}, \ldots D_{n,j}$) associated with this basic entity and representing the operating status thereof.

5. Device according to claim 3, wherein the said plans comprise a general plan which has the lowest level of detail and depicts the installation (3) in its entirety, this general plan being displayed permanently and in parallel with plans with a higher level of detail by the said display unit (11), and in that the communicating means (13) comprise means (27) of displaying, on this general plan, an item of information that relates to the position of that part of the installation that is depicted in parallel on another synoptic diagram with a higher level of detail.

6. Device according to claim 1, wherein the means (15) for processing and controlling the selective displaying comprise means (29) of coding the operating statuses so that the said information can be displayed in coded form.

7. Device according to claim 6, wherein the code used by the coding means (29) is a three-colour code, in which one colour is associated with correct operation, one with a malfunction of minor significance and one with a significant malfunction.

8. Method for monitoring the operation of an industrial installation, the installation comprising functional members, wherein the method comprises the following steps of:
   detecting a functional status of the functional members;
   forming groups of detected functional statuses, wherein each group is associated with a particular functional aspect that is to be monitored; and
   permanently displaying an overall operating status of each group of detected functional statuses on a display unit.

9. Method according to claim 8, further comprising in a step which consists in the said display unit (11) displaying, under the control of an operator, a plan that depicts at least part of the layout of the functional members of the installation together with at least one item of information indicating on the displayed plan the geographical position of at least one detected malfunction.

10. Method according to claim 9, wherein the said plans depict various levels of detail and in that it further comprises the step which consists in selecting, under the control of the operator, a plan in order to move on from one level of detail to another.

11. Method according to claim 10, wherein the said plans with the highest level of detail each depict, in a synoptic view, a station ($P_1, P_2, \ldots P_o$) for supplying or distributing gas, and in that it comprises the step which consists in displaying, on these plans with the highest level of detail, values of measurements that characterize the detected operating status.

12. Method according to claim 10, wherein the said plans comprise a general plan which has the lowest level of representation and depicts the installation (3) in its entirety, and that it comprises the step which consists in displaying this general plan permanently and in parallel with plans with a higher level of detail on the said display unit (11), and in that there is displayed on this general plan, an item of information that relates to the position of that part of the installation that is depicted in parallel on another synoptic diagram with a higher level of detail.

13. Method according to claim 8, further comprising the step which consists in coding the operating statuses and in displaying the operating statuses in coded form.

14. Method according to claim 13, wherein the code used for coding is a three-colour code in which one colour is associated with correct operation, one with a malfunction of minor significance and one with a significant malfunction.

15. Device according to claim 2, wherein the means for processing and controlling the selective displaying comprise means of coding the operating statuses so that the said information can be displayed in coded form.

16. Device according to claim 3, wherein the means for processing and controlling the selective displaying comprise means of coding the operating statuses so that the said information can be displayed in coded form.

17. Device according to claim 4, wherein the means for processing and controlling the selective displaying comprise means of coding the operating statuses so that the said information can be displayed in coded form.

18. Device according to claim 5, wherein the means for processing and controlling the selective displaying comprise means of coding the operating statuses so that the said information can be displayed in coded form.

19. Method according to claim 9, wherein the method further comprises the step of coding the operating statuses and displaying the operating statuses in coded form.

20. Method according to claim 10, wherein the method further comprises the step of coding the operating statuses and displaying the operating statuses in coded form.

21. Method according to claim 11, wherein the method further comprises the step of coding the operating statuses and displaying the operating statuses in coded form.

22. Method according to claim 12, wherein the method further comprises the step of coding the operating statuses and displaying the operating statuses in coded form.

23. The device according to claim 1, wherein the particular aspect that is to be monitored is a gas leak or an operating status of a functional member.

24. The method according to claim 8, wherein the particular aspect that is to be monitored is a gas leak or an operational status of a specific station.

25. Device for monitoring the operation of an industrial installation, wherein the installation comprises functional members, the device comprising groups of detectors that detect the operating status of each of the functional members, wherein each group of detectors is associated with a particular functional aspect that is to be monitored, and a display unit comprising a device for communicating the operating statuses picked up by the detectors, wherein the device for communicating the operating statuses comprises, arranged between the detectors and the display unit, a device for processing the operating statuses picked by the detectors and for controlling the selected displaying, on the display unit, of information relating to an overall operating status of each group of detectors.

26. Device according to claim 25, wherein the industrial installation is an installation for supplying gas for the manufacture of circuits in the microelectronics industry.

27. Device according to claim 1, wherein the industrial installation is an installation for supplying gas for the manufacture of circuits in the microelectronics industry.

28. Method according to claim 8, wherein the industrial installation is an installation for supplying gas for the manufacture of circuits in the microelectronics industry.

* * * * *